US008228429B2

United States Patent
Lu et al.

(10) Patent No.: US 8,228,429 B2
(45) Date of Patent: Jul. 24, 2012

(54) REDUCING ARTIFACTS AS A RESULT OF VIDEO DE-INTERLACING

(75) Inventors: Tiehan Lu, Shanghai (CN); Chunjuan Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 12/286,230

(22) Filed: Sep. 29, 2008

(65) Prior Publication Data

US 2010/0079668 A1    Apr. 1, 2010

(51) Int. Cl.
*H04N 11/20*    (2006.01)

(52) U.S. Cl. .................................. 348/448; 348/452

(58) Field of Classification Search .................. 348/452, 348/448, 607, 618, 701, 441, 458; 382/298–300, 382/276
See application file for complete search history.

(56) References Cited

U.S. PATENT DOCUMENTS

| | | | | |
|---|---|---|---|---|
| 5,019,903 A * | 5/1991 | Dougall et al. | ............... | 348/448 |
| 5,625,421 A * | 4/1997 | Faroudja et al. | .............. | 348/607 |
| 6,545,719 B1 * | 4/2003 | Topper | ......................... | 348/448 |
| 6,628,341 B1 * | 9/2003 | Staley et al. | .................. | 348/607 |
| 6,680,752 B1 * | 1/2004 | Callway et al. | ............... | 348/448 |
| 6,930,729 B2 * | 8/2005 | Min | .............................. | 348/607 |
| 7,443,448 B2 * | 10/2008 | Yang et al. | .................... | 348/441 |
| 7,538,824 B1 * | 5/2009 | Pillay et al. | ................... | 348/701 |
| 7,548,663 B2 * | 6/2009 | Chao | ............................ | 382/300 |
| 2003/0098925 A1 * | 5/2003 | Orlick | .......................... | 348/448 |
| 2004/0207753 A1 * | 10/2004 | Jung | ............................ | 348/452 |
| 2005/0030424 A1 * | 2/2005 | De Haan et al. | ............. | 348/458 |
| 2006/0215058 A1 | 9/2006 | Lu et al. | | |
| 2008/0122974 A1 * | 5/2008 | Adams | ......................... | 348/448 |
| 2008/0136963 A1 * | 6/2008 | Palfner | ........................ | 348/448 |
| 2009/0102966 A1 * | 4/2009 | Jiang et al. | .................... | 348/448 |

* cited by examiner

*Primary Examiner* — Victor Kostak
(74) *Attorney, Agent, or Firm* — Trop, Pruner & Hu, P.C.

(57) ABSTRACT

In accordance with some embodiments of the present invention, de-interlacing may be accomplished by using an edge gradient to select a best interpolation direction for several adjacent pixels between two lines of interlaced video. The interpolation of the intermediate line is performed using the best direction. Then the pixels in the line above and below are analyzed to determine whether the interpolated pixel value should actually be used in view of the possible presence of artifacts.

10 Claims, 2 Drawing Sheets

REDUCING ARTIFACTS AS A RESULT OF VIDEO DE-INTERLACING

BACKGROUND

This relates to video processing pipelines that convert interlaced to progressive scan or de-interlaced video.

For a variety of applications, interlaced video signal frames are converted to a progressive scan format. Interlaced video includes fields with only odd or even lines of video. For example, interlaced signal received over the air may be converted to a progressive scan format for display on a digital video monitor. The conversion generally involves interpolating the missing lines of video, either even or odd, in each interlaced video field.

A number of de-interlacing techniques have been proposed. According to an inter-field technique known as "weave", the interpolated pixel is taken from the corresponding pixel in the previous field. This technique may result in artifacts when there is motion in the video signal at the point of interpolation.

According to an intra-field technique known as "bob", the pixel value to be generated is interpolated from the two pixels in the same field which are respectively directly above and directly below the pixel to be generated. This technique may result in loss of resolution and creation of certain artifacts.

In another technique, sometimes referred to as "motion adaptive" de-interlacing, motion detection is applied at the point where interpolation is occurring. If there is no motion, a "weave" approach is applied. If there is motion at the current point, a "bob" approach is applied. In another proposed motion adaptive de-interlacing technique, the pixel value to be generated is obtained as a weighted average of the pixel values that would be obtained by the "bob" and "weave" approaches, and the weights applied to the bob and weave pixel values vary depending on the degree of motion. Even with these approaches, however, image quality may be less than ideal.

Another technique is known as "motion compensated" de-interlacing. In this approach, motion between the current field and the previous field is estimated to produce motion vectors at, for example, each pixel location. Then interpolation is performed using pixels from the previous frame that have been relocated in accordance with the motion vectors. Motion compensated de-interlacing generally produces superior results in terms of image quality, but requires a high degree of processing complexity, and may still fall short of an ideal level of image quality.

DETAILED DESCRIPTION

Figure 1:
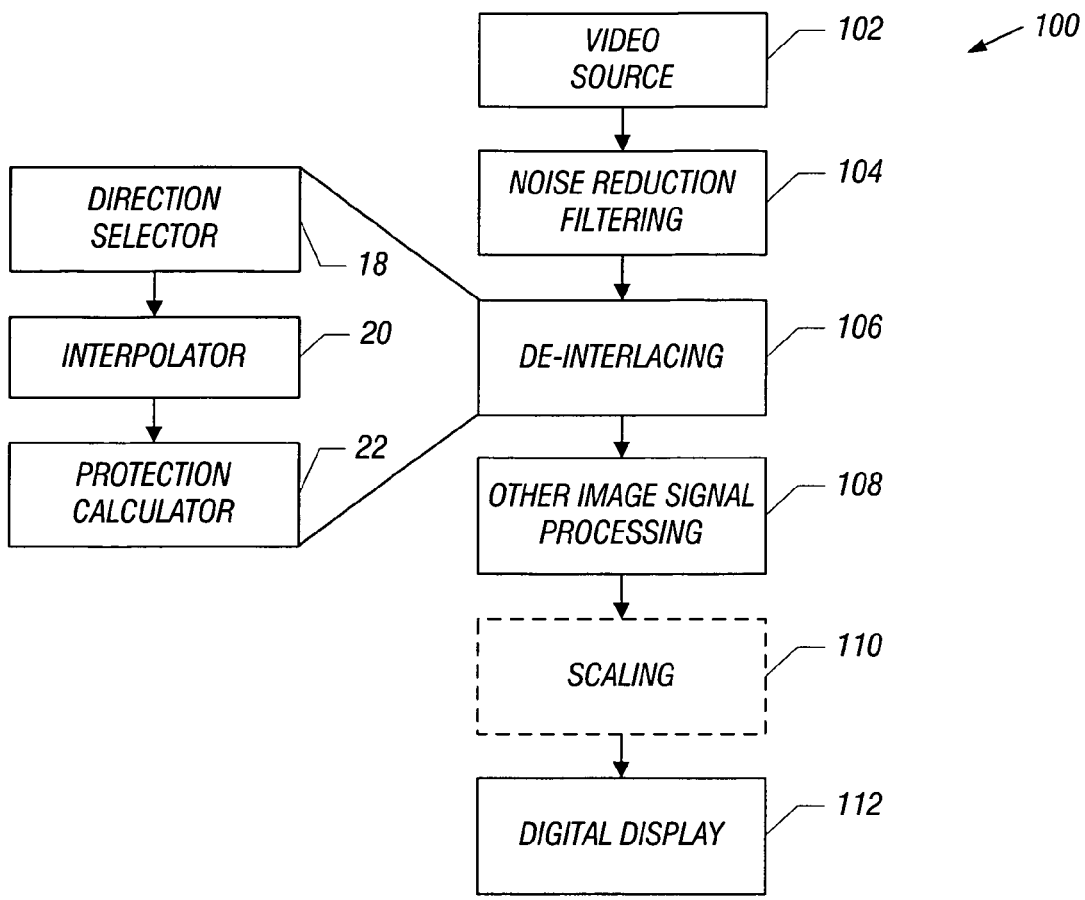
FIG. 1 is a block diagram of a video processing pipeline which performs a de-interlacing process in accordance with some embodiments.

The video processing pipeline apparatus 100, shown in FIG. 1, includes a source 102 of interlaced video signal. Though not separately shown, the source 102 may include suitable circuitry for converting the interlaced video signal into a digital interlaced video signal. Examples of video sources are tuners, DVD or other media players, set top boxes, and digital televisions.

The apparatus 100 may also include a noise reduction filtering block 104, coupled to the source 102. The block 104 performs noise reduction filtering on the digital signal provided by the source 102.

In addition, the apparatus 100 includes a de-interlacing process block 106, coupled to the noise reduction filtering block 104. The block 100 performs de-interlacing of the digital video signal in accordance with some embodiments. The de-interlacing process block 106 may be considered to be coupled to the source 102 via the noise reduction filter block 104.

Further, the apparatus 100 may include one or more other image signal processing blocks 108 to perform one or more other processes on the de-interlaced video signal, such as sharpness enhancement, color correction, gamma correction, etc.

The apparatus 100 may also include a scaling block 110 (shown in phantom) to perform resizing of the image for display on a digital display component 112, which is also included in the apparatus 106.

Except for the de-interlacing process block 100, the components of the apparatus 100 may be configured and may operate in accordance with conventional practices.

A de-interlacing process may be performed at some or all of the locations of pixels that are to be interpolated to supply missing lines of a video signal field and thus to de-interlace the video signal field. This process may be considered to be an intra-field de-interlacing process, since the interpolation of missing pixels relies on pixel data from other pixels in the same field. Each process stage may be performed at a single pixel location for a pixel to be interpolated, and may be repeated at each pixel location.

At top, bottom, and/or side image edges, missing pixel values may be generated by processes such as filling with black pixels, filling with duplicates of edge pixel values, or mirroring pixel values from the edge. Alternatively at the edges, a de-interlacing process such as "bob" or "weave" may be used.

Figure 2:
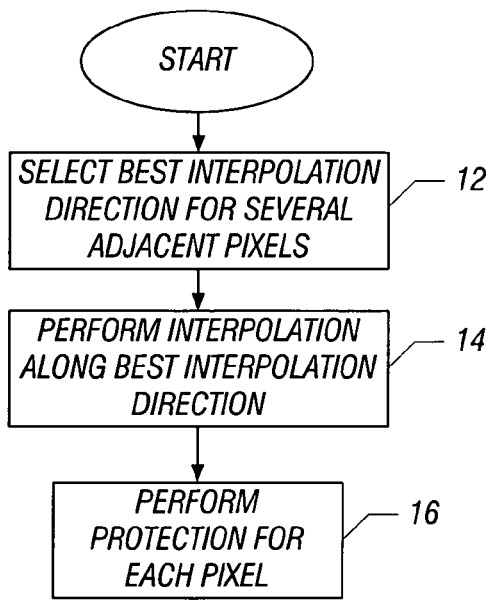
FIG. 2 is a flow chart that illustrates a de-interlacing sequence provided according to some embodiments.

At block 12 in FIG. 2, a best interpolation direction is determined for performing interpolation at the current pixel location using the direction selector 18 (FIG. 1). That is, the edge gradient, if any, is measured in a number of different directions. More specifically, an edge gradient score is calculated for each of a number of possible interpolation directions and the best interpolation direction, which has the lowest edge gradient score, is determined in some embodiments. Then interpolation is performed along the best direction (block 14) using the interpolator 20 of FIG. 1.

Figure 5:
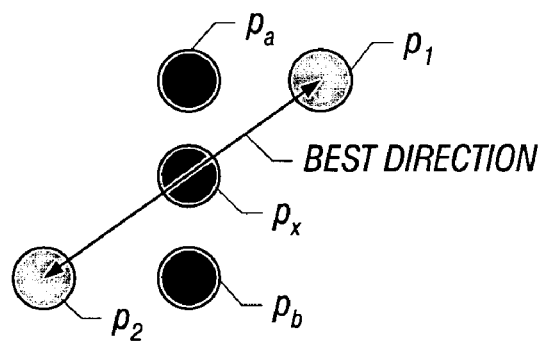
FIG. 5 schematically illustrates still another aspect of the sequence of FIG. 2.

The average "p" of the intensities of the two pixels $p_1$ and $p_2$ in the best direction is determined, as indicated in FIG. 5. Then protection is performed in the best direction using the average p to reduce visible artifacts using the protection calculator 22 of FIG. 1. The two neighbor pixels in the best direction may be used to reduce artifacts in the interpolation result.

As shown in FIG. 5, the intensity values pa and pb for the pixels pa above and pb below the pixel px to be de-interlaced are analyzed as follows:

```
if p ≦ MAX(pa, pb) + th and p ≧ MIN(pa, pb) − th then
    output = p;
else
    output = average(pa, pb);
```

Here th is an integer threshold. In one implementation, th=5.

Figure 3:
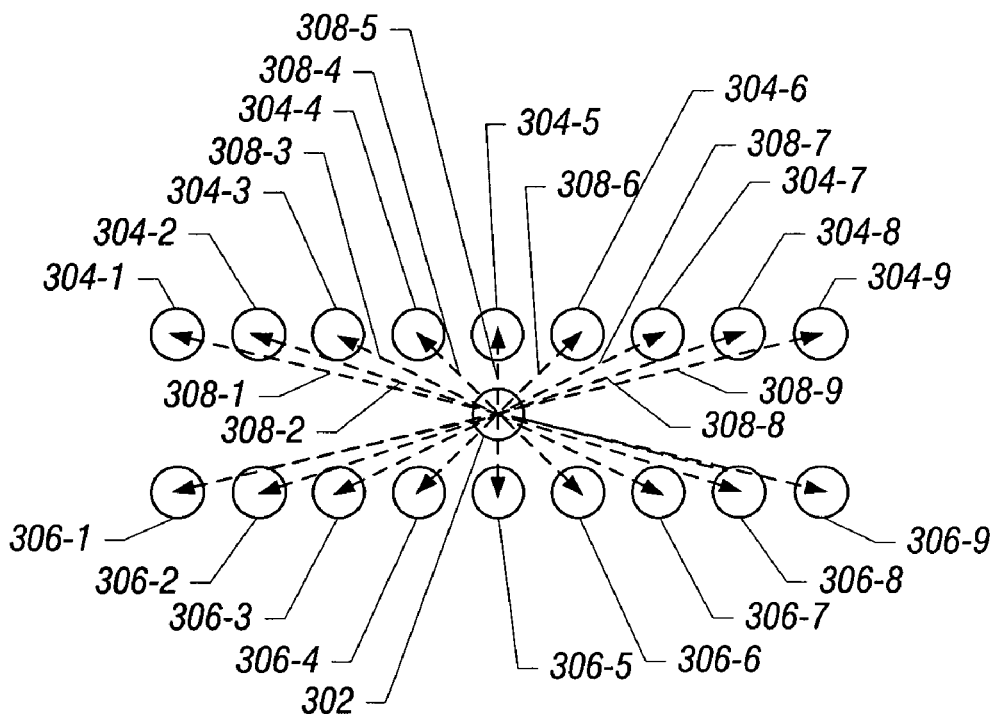
FIG. 3 schematically illustrates an aspect of the sequence of FIG. 2.

In FIG. 3, circle 302 indicates the location for a pixel whose pixel value is currently being interpolated. Pixels 304-1 to 304-9 are pixels that make up part of a video signal line that is immediately above current pixel location 302. The pixel values for pixels 304-1 to 304-9 are available, since the line that includes those pixels is included in the current field, whereas the line that includes pixel location 302 is a missing line that is to be supplied by interpolation in order to de-interlace the current field. Pixel 304-5 is the pixel that is immediately above the current pixel location 302. Pixel 304-4 is the pixel that is immediately to the left of pixel 304-5; pixel 304-3 is the pixel that is immediately to the left of pixel 304-4; pixel 304-2 is the pixel that is immediately to the left of pixel 304-3; pixel 304-1 is the pixel that is immediately to the left of pixel 304-2. Pixel 304-6 is the pixel that is immediately to the right of pixel 304-5; pixel 304-7 is the pixel that is immediately to the right of pixel 304-6; pixel 304-8 is the pixel that is immediately to the right of pixel 304-7; pixel 304-9 is the pixel that is immediately to the right of pixel 304-8.

Pixels 306-1 to 306-9 are pixels that make up part of a video signal line that is immediately below current pixel location 302. Again, the pixel values for pixels 306-1 to 306-9 are available since the line that includes those pixels is included in the current field. Pixel 306-5 is the pixel that is immediately below the current pixel location 302. Pixel 306-4 is the pixel that is immediately to the left of pixel 306-5; pixel 306-3 is the pixel that is immediately to the left of pixel 306-4; pixel 306-2 is the pixel that is immediately to the left of pixel 306-3; pixel 306-1 is the pixel that is immediately to the left of pixel 306-2. Pixel 306-6 is the pixel that is immediately to the right of pixel 306-5; pixel 306-7 is the pixel that is immediately to the right of pixel 306-6; pixel 306-8 is the pixel that is immediately to the right of pixel 306-7; pixel 306-9 is the pixel that is immediately to the right of pixel 306-8.

In the embodiments illustrated by FIG. 3, nine possible interpolation directions are examined (scored) and one of the nine directions is selected. The nine possible directions include: (a) direction 308-1, which runs from pixel 304-1 through pixel location 302 to pixel 306-9; (b) direction 308-2, which runs from pixel 304-2 through pixel location 302 to pixel 306-8; (c) direction 308-3, which runs from pixel 304-3 through pixel location 302 to pixel 306-7; (d) direction 308-4, which runs from pixel 304-4 through pixel location 302 to pixel 306-6; (e) direction 308-5, which runs from pixel 304-5 through pixel location 302 to pixel 306-5; (f) direction 308-6, which runs from pixel 304-6 through pixel location 302 to pixel 306-4; (g) direction 308-7, which runs from pixel 304-7 through pixel location 302 to pixel 306-3; (h) direction 308-8, which runs from pixel 304-8 through pixel location 302 to pixel 306-2; (i) direction 308-9, which runs from pixel 304-9 through pixel location 302 to pixel 306-1.

Figure 4:
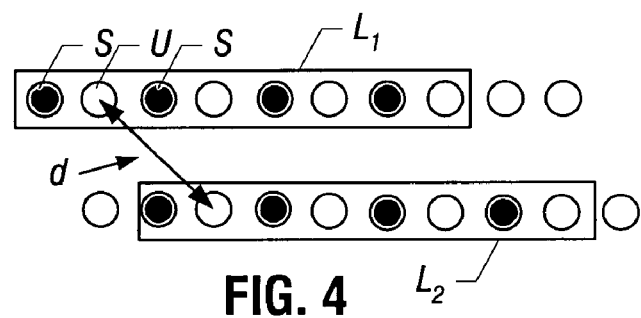
FIG. 4 schematically illustrates another aspect of the sequence of FIG. 2.

In accordance with some embodiments, the examination or scoring for each direction, indicated in FIG. 4, may include calculating a sum of absolute differences between (i) a rectangular line $L_1$ of pixels that is centered at the one of pixels 304 which corresponds to the direction in question and (ii) a rectangular line $L_2$ of pixels that is centered at the one of pixels 306 which corresponds to the direction "d" in question. To illustrate, in the case of scoring the direction 308-3, the sum of absolute differences (SAD) of edge gradients is calculated between a rectangular line $L_1$ of pixels that is centered at pixel 304-3 and a rectangular line $L_2$ of pixels that is centered at pixel 306-7.

For each of the nine possible interpolation directions, let Window 1 be the window centered at the corresponding pixel 304 for the direction in question (e.g., pixel 304-3 in the case of direction 308-3) and let Window 2 be the window centered at the corresponding pixel 306 for the direction in question (e.g., pixel 306-7 in the case of direction 308-3). Let P.sub.1 (i,j) be the pixel value for the i'th pixel in the j'th row of Window 1 and let P.sub.2 (i,j) be the pixel value for the i'th pixel in the j'th row of Window 2.

For each possible interpolation direction, the SAD, which is the score for the direction, may be calculated as follows:

$$\sum_{1 \leq i \leq 7, 1 \leq j \leq 3} |P_1(i, j) - (P_2(i, j)|$$

The direction which is found to have the lowest score (i.e., the lowest SAD) is determined to be the best interpolation direction. In other words, the direction which shows the least edge gradient is selected as the direction along which interpolation occurs. At block 12 in FIG. 2, interpolation along the selected direction is performed by taking the arithmetic mean of the respective values for the pixel 304 and the pixel 306 which correspond to the selected direction. For example, if direction 308-3 is selected (as having the lowest SAD score), then the arithmetic mean is taken of the values of pixels 304-3 and 306-7. The resulting mean value is considered to be a candidate pixel value and is taken as one input of a median function which is applied at 14 in FIG. 2. In some embodiments, the median function has six other inputs, namely the six pixel values of pixels 304-4, 304-5, 304-6, 306-4, 306-5 and 306-6. The output of the median function is taken as the interpolated pixel value for the current pixel location 302.

Instead of examining nine possible interpolation directions, as in the example above, in other embodiments the number of possible interpolation directions to be examined may be three, five, seven, eleven or more, or other numbers of interpolation directions. In addition, instead of performing the SAD analysis on each adjacent pixel, one or more intervening pixels may be skipped in favor of a sampling technique, as indicated in FIG. 4. For example, (shaded) pixels H may be selected while not selecting unselected (unshaded) pixels U. It is also possible just to skip the first unshaded pixel in another embodiment.

The window dimensions for the SAD calculation need not be as depicted in FIG. 4; other dimensions may be used. In some embodiments, effectively the window may only be a single pixel, namely the pixel 304 or 306 associated with the interpolation direction that is being examined (i.e., scored). To be more explicit, in these embodiments the score for each interpolation direction may be the absolute value of the difference between the respective values for the pixel 304 and the pixel 306 associated with the interpolation direction in question.

In some embodiments, the number of inputs to the median function may be different than described above. For example, in some embodiments the number of inputs to the median function may be three, namely the candidate pixel value calculated at 204 plus the respective values for pixels 304-5 and 306-5.

The intra-field de-interlacing process described with reference to FIGS. 2-5 may produce quite good image quality while requiring a rather modest degree of calculating complexity, in some embodiments. Consequently, the process of FIGS. 2-5 may embody a favorable trade-off between complexity and image quality in some embodiments.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

In the above-described embodiment, the interpolation direction is calculated for each pixel. However, a best direction may also be calculated for several pixels using the method described above with interpolation and protection done for each pixel individually.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    using an edge gradient to select a best interpolation direction for several adjacent pixels between two lines of pixels in interlaced video;
    performing an interpolation of an intermediate line between said lines of pixels using said best interpolation direction;
    analyzing the pixels in the lines above and below each interpolated pixel to reduce artifacts;
    determining if the interpolated pixel is less than or equal to the maximum intensity of the pixels above and below the interpolated pixel plus a threshold;
    determining whether the interpolated pixel is greater than or equal to the minimum of the intensity of the pixels above and below the interpolated pixel minus the threshold; and
    wherein if the interpolated pixel intensity is less than or equal to the maximum and greater than or equal to the minimum, outputting the value of the interpolated pixel and, otherwise, outputting the average intensity of the pixels above and below the interpolated pixel as the intensity value for the interpolated pixel.

2. The method of claim 1 including using five as the threshold.

3. The method of claim 1 including determining the best direction for less than all the pixels.

4. The method of claim 3 including determining the best direction for every other pixel of a group of pixels in each of said lines.

5. An apparatus comprising:
    a direction selector to select a best interpolation direction for several adjacent pixels;
    an interpolator to perform interpolation along the best interpolation direction; and
    a protection calculator to analyze pixels in the lines above and below an interpolated pixel to reduce artifacts, wherein said protection calculator to determine if the interpolated pixel is less than or equal to the maximum intensity of the pixels above and below the interpolated pixel plus the threshold and to determine whether the interpolated pixel is greater than or equal to the minimum of the intensity of the pixels above and below the interpolated pixel minus a threshold, and wherein said calculator to output the value of the interpolated pixel if the interpolated pixel intensity is less than or equal to the maximum and greater than or equal to the minimum and, otherwise, to output the average of the intensity of pixels above and below the interpolated pixel.

6. The apparatus of claim 5 further including a video source.

7. The apparatus of claim 6 including a digital display coupled to said source.

8. The apparatus of claim 5 wherein said calculator uses a threshold of five.

9. The apparatus of claim 5, said direction selector to determine the best direction for less than all the pixels.

10. The apparatus of claim 9, said selector to determine the best direction for every other pixel of a group of pixels in each of said lines.

* * * * *